United States Patent [19]

Schaff

[11] Patent Number: 4,881,147
[45] Date of Patent: Nov. 14, 1989

[54] PROTECTION OF SENSITIVE ELECTRICAL INSTALLATIONS AGAINST THE EFFECTS OF LIGHTNING, AND DEVICES PROPOSED FOR SUCH ARRANGEMENT

[76] Inventor: Jean-Paul Schaff, 18 avenue des Tilleuls, F-63400 Chamalieres, France

[21] Appl. No.: 9,331

[22] Filed: Mar. 2, 1987

[51] Int. Cl.$^4$ .............................................. H02H 1/04
[52] U.S. Cl. ...................... 361/118; 361/56; 361/127; 361/138
[58] Field of Search ................. 361/56, 117, 118, 126, 361/127, 137, 138; 336/65; 439/92; 174/6, 51, 78

[56] References Cited

U.S. PATENT DOCUMENTS

| | | | |
|---|---|---|---|
| 1,477,307 | 12/1923 | Allcutt | 361/138 |
| 1,755,324 | 4/1930 | Jacobs | 361/137 |
| 2,993,146 | 7/1961 | Winter | 361/117 X |
| 3,631,323 | 12/1971 | Pittman | 361/127 |
| 3,673,459 | 6/1972 | Carpenter | 361/137 |
| 4,328,523 | 5/1982 | Seguin | 361/56 |
| 4,563,720 | 1/1986 | Clark | 361/56 |
| 4,665,460 | 5/1987 | Schaff | 361/137 |

FOREIGN PATENT DOCUMENTS

| | | |
|---|---|---|
| 0092052 | 10/1983 | European Pat. Off. . |
| 2143543 | 3/1973 | Fed. Rep. of Germany . |
| 2920979 | 11/1980 | Fed. Rep. of Germany . |
| 2554284 | 5/1985 | France . |

Primary Examiner—Derek S. Jennings
Attorney, Agent, or Firm—Lee C. Robinson, Jr.

[57] ABSTRACT

The protection arrangement according to the invention for protecting electric installations against lightning effects is characterized in that an electric relationship between a multiphase input line and the installation includes for each of the phases at least a first set of spark-gap arresters, at least a first self-inductance coil and at least a first variable resistance lightning arrester. Such an arrangement is particularly applicable to the protection of transformation units, hertzian relays or other delicate electric or electronic installations.

13 Claims, 11 Drawing Sheets

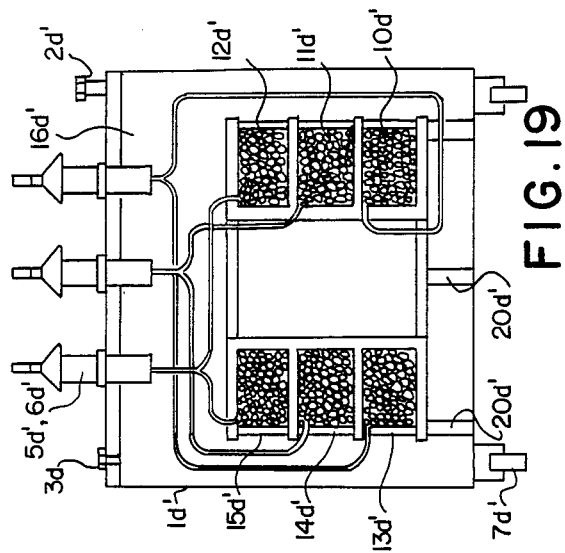
FIG. 19
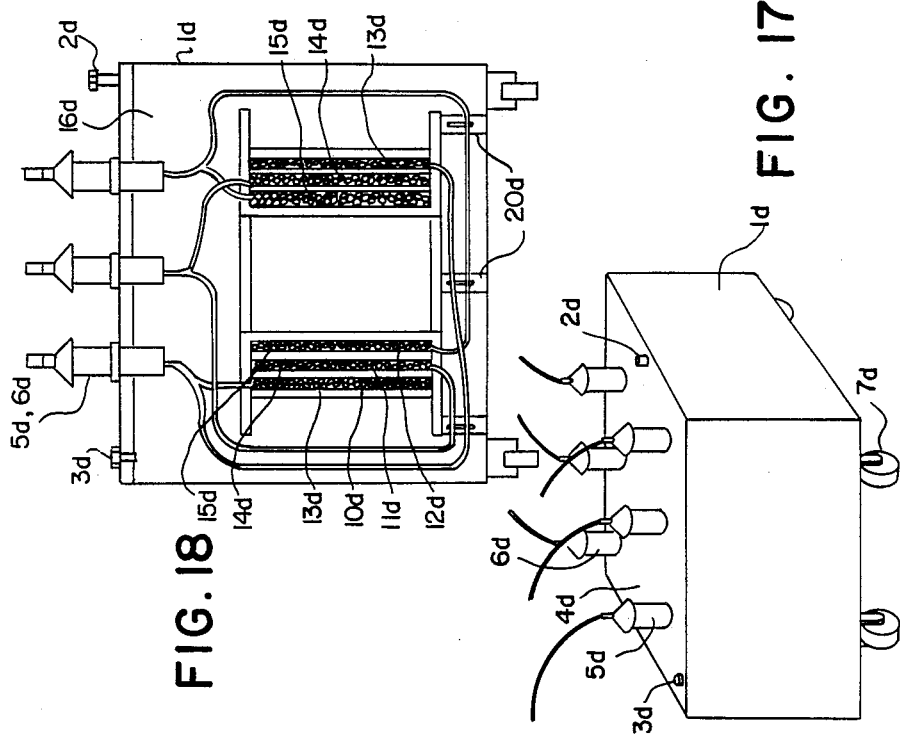
FIG. 17
FIG. 18

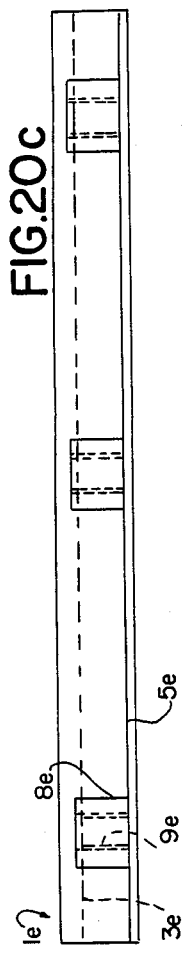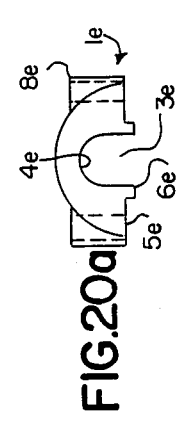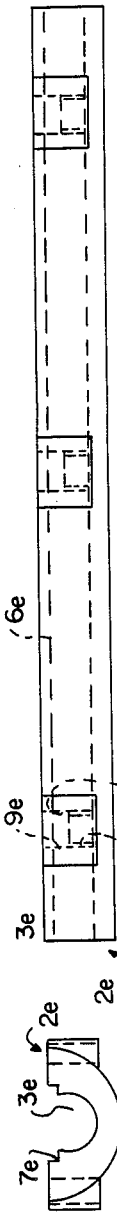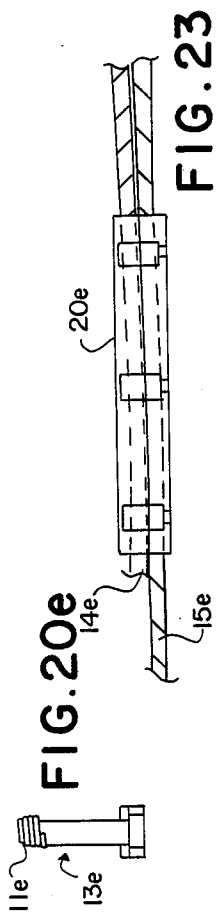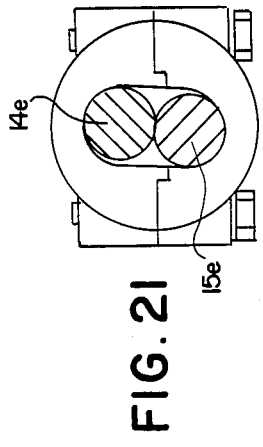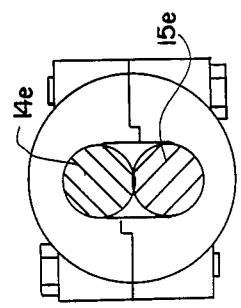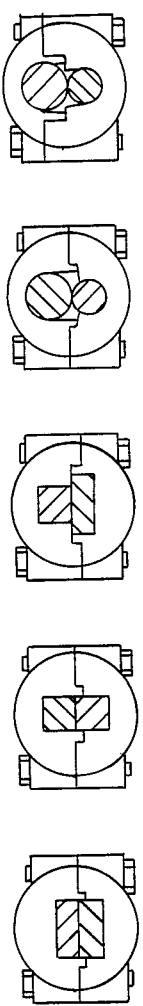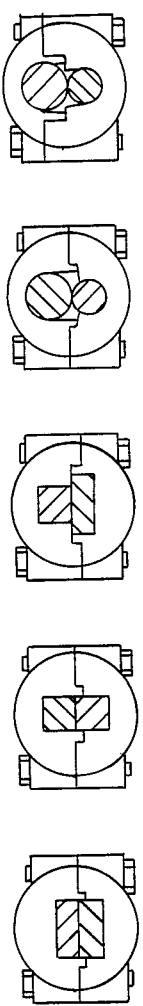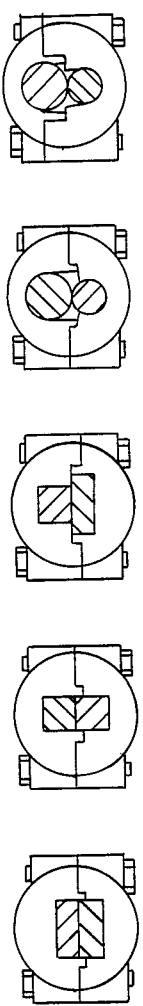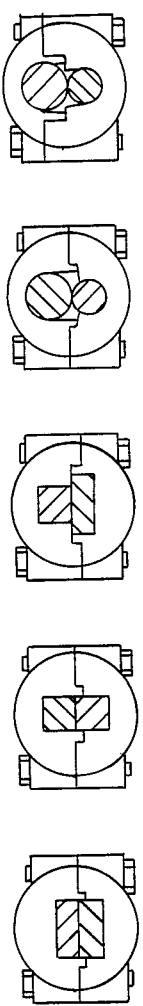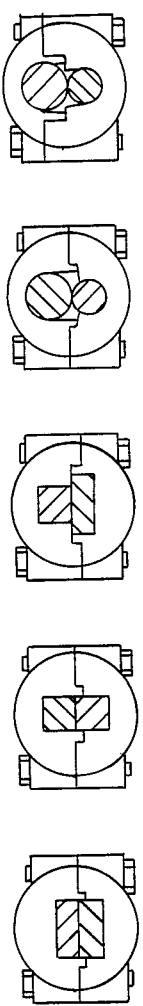

PROTECTION OF SENSITIVE ELECTRICAL INSTALLATIONS AGAINST THE EFFECTS OF LIGHTNING, AND DEVICES PROPOSED FOR SUCH ARRANGEMENT

CROSS-REFERENCE TO RELATED APPLICATION

Pursuant to 35 U.S.C. 120 and 365(c), applicant claims the benefit of the filing date of copending application PCT/FR85/00101 filed Apr. 30, 1985.

BACKGROUND OF THE INVENTION

This invention falls in the domain of electricity techniques, and it covers an arrangement of means intended to protect an electrical installation from the effects of lightning. Illustrative examples of such an installation include a transformer facility, an installation for the transmission of Hertz waves or other, or other sensitive electrical or electronic installations.

This invention involves the application of elements known in the previous art, such as the variable resistance lightning arrester, and the spark gap rod, means for the connection of electrical conductors, grounding connections.

As is well known, a variable resistance arrester comprises a device having a resitance which varies according to the applied voltage. Devices of this type commonly are made from powdered silicone carbide molded with a ceramic bond and exhibit extremely high resistance in cases in which the voltage approaches 1000 volts, for example. Should lightening or other factors cause a sudden increase in the applied voltage to, say, 10,000 volts, however, the resistance instantaneously breaks down and permits the passage of current.

SUMMARY

According to this invention an arrangement for the protection, from the effects of lightning, of an electric power transformer station or other sensitive electrical installation supplied from an incoming line, is generally characterized in that the electrical relation between the incoming line and the installation involves, for each phase: at least a first set of spark arresters, at least a first inductance coil, and at least a first variable resistance lightning arrester. The transformer or other installation is mounted on high dielectric capacity rollers. According to this arrangement it is of course understood that the spark arresters as well as the variable resistance arrester are mounted in derivation on each of the phases while the inductance coils are mounted in series on them.

It is preferable that the insulation of at least the wires of the windings of said first inductance coil be at least 1 KV in permanent nominal tension.

Preferably at least said first set of spark arresters, at least said first variable resistance arrester and the transformer or other installation, are connected to the ground through conductors insulated for a minimum of 1,000 V.

Preferably, and as described above, the spark arresters of the first set of arresters at least are of the type, known as "high discharge type", described in French patent application Ser. No. 8308954.

Preferably, finally, and this conditions the excellent performance of the above described protection, the grounding connectors of the spark arresters are insulated and arranged in the vicinity of the ground in an insulated sheath comprising fasteners, also insulated, equipped with non magnetic screws.

The arrangement as described above applies for example to a line terminal supplying a sensitive electrical installation but it could just as well apply to a transformer station, constituting the sensitive electrical installation comprising a low or medium tension outgoing line; in this case the electrical relationship between said transformer station and the outgoing line (generally an overhead line) comprises for each of the phases at least a second set of spark arresters, at least a second inductance coil and at least a second variable resistance lightning arrester. The general arrangement described above is best obtained with horn arresters and inductance coils of which certain characteristics are also covered by this invention.

An arrester horn covered by the invention comprises, as a first characteristic, an oblong opening near the middle of that branch which is intended to be a horizontal branch.

According to a second characteristic, the forementioned oblong opening is off-center with respect to the longitudinal axis of said horizontal branch.

According to a first variant, the section of said horn along its parts other than those surrounding said opening, is a square section.

According to a second variant, the section of the horn along its parts other than those surrounding said opening, is a rectangular section; according to a first alternative, the large dimension of the rectangle of said rectangular section is parallel to the plane of the horn; according to another alternative, the large dimension of the rectangle of said rectangular section is perpendicular to the plane of the horn.

According to a third variant, the section of said horn along the parts other than those surrounding the opening, is a circular section.

According to a secondary characteristic, the end of the socalled horizontal branch opposite the so-called inclined other branch, is threaded.

According to another secondary characteristic, the component metal of said horn is a non magnetic metal, preferably an aluminum alloy such as duralinox, or yet stainless steel or other non magnetic metal, as desired.

The invention also concerns a single pole inductance coil of the type comprising a winding of electroconducting wires arranged about a sleeve, characterized in that the sleeve is made of polyethylene or other equivalent material having at least equal dielectrical characteristics, a pair of insulators of a material such as glass or ceramic, the insulators being components of the feet supporting the sleeve, with connecting metallic elements providing at the same time the mechanical relation between the sleeve and the insulators and the electrical relation between the coil wound around the sleeve and the parts of the electrical conducting line on which the coil is mounted in series, these connecting elements being parts made of non magnetic metal and apt to incorporate fasteners of like nature.

Preferably, the winding comprises a single layer of conducting wires; however this is not an essential characteristic and, if space is short, the wire may be wound in several layers.

The conducting wire composing the coil or winding is insulated by means of a varnish or sheathing of the same nature as the component material of the sleeve, providing insulation for at least 1,000 volts minimum tension in continuous service.

The outside diameter of the sleeve, and therefore the diameter of the winding, is preferably between 250 and 300 mm, while the number of loops is between 50 and 100.

The insulators used are rigorously identical and homogeneous in their dielectric, mechanical and other characteristics.

An inductance coil, or several coils if the grid is multiphase, is characterized according to this invention in that said coil at least is bathed in a highly dielectric medium contained in an enclosure or pan electrically insulated from the ground; preferably this medium consists of transformer oil; preferably also, said pan is made of a metal which is a good conductor; preferably also, said metal is a non magnetic metal.

According to one embodiment the windings of said several coils are made of concentric layers. According to another embodiment, the coils consist of coaxial windings arranged side by side.

Preferably, and also generally, said windings are supported in said pan by insulating blocks. Each winding passes through the wall of the pan, through standard transformer type porcelain terminals. Preferably, said pan includes a wall grounding terminal. Preferably also, the insulation of the pan with respect to the ground is provided by rollers made of high insulating power material. Preferably, finally, each winding is surrounded by a casing of high dielectric coefficient material.

The triple coil cancels tension surges in a balanced manner on the combined phases and reciprocally between them, and thanks to its pan made of non magnetic material, roughly cubic in shape and highly insulated from the ground, this pan functions as an equipotential volume protection for all the coils its contains; it should be noted that this shape of the pan is very important for the proper operation of the device.

It is known in fact that lightning, as well as the effects it induces in conductors, particularly overhead conductors, takes the form of a very short period wave of fairly great amplitude, particularly in tension; it is also known that an electrical wave of very short period is arrested by the coils by reason of their self inductance property; however, although this property of the coils is known, and to the best knowledge of the Applicant, no one has ever systematically attempted to use it, in electrical installations, as a means of protection against the direct or indirect effects of lightning.

Finally, the protective device according to the invention advantageously incorporates, for the junction of electrical conducting cables, a connecting device of the shell type also covered by the invention. According to a characteristic of this connecting device, each of the shells is an elongated solid metal piece comprising an axial recess and having in addition, along the contacting faces of the shells, longitudinal reliefs intended to fit into one another.

Preferably, a portion at least of the axial recess is semi cylindrical.

Preferably, the ratio of the length of the shells to their smaller transversal dimension, when they are coupled together, is more than six.

Preferably also, a plurality of threading lugs for screwing comprises an axial boring perpendicular to the plane of contact of the shells.

Preferably also, said plurality of lugs numbers three for each of the two sides of each shell.

Preferably also, the axial borings of the lugs of at least one of the sides of a shell are tapped along part of their length only, and the fastening screws are threaded along a portion of their length near the end, the length of the threaded part being less than the length of the untapped portion of the lugs.

Preferably still, the shells, when they are coupled together, have a symmetry of order 2, or yet each of the shells is identical to the other.

Preferably still, said shells, their fastening screws and washers, are made of non magnetic material.

Preferably still, said good conducting non magnetic material is either bronze, aluminum, copper or brass.

Preferably finally, the cumulative depth of the recesses of two coupled shells is slightly less than the cumulative thicknesses of the conductors intended to be connected, and the widths of the axial recesses are respectively equal to the widths of the connected conductors. In the case of two conductors with equal circular section, the recess comprises a portion with semi cylindrical wall and the cumulative depth of the recesses of two coupled shells is slightly less than twice the diameter of the conductors intended to be connected, and the radius of the semi cylindrical part of the recess is equal to the radius of the conductors.

This invention, under all its different aspects, will be better understood and the relative details will appear from the following description of examples thereof, made in relation to the attached drawings in which:

BRIEF DESCRIPTION OF THE DRAWING

FIG. 17 is a perspective illustration of the device of this invention as seen from the outside.

FIG. 18 is a schematic illustration in section of a first embodiment of the device of FIG. 17.

FIG. 19 is a schematic illustration in section of a second embodiment of the device of FIG. 17.

FIGS. 20a, 20b, 20c, 20d and 20e illustrate, in end and side views, two shells and the fastening screws intended to couple them together.

FIG. 21 is a sectional view in enlarged scale of a device with shells assembled for the connection of two cables.

FIG. 22 is a representation, similar to that of the previous figure, of a variant of the device according to the invention.

FIG. 23 illustrates, in side view and in smaller scale than FIG. 21, a connection of electrical conductors by means of the device illustrated in that figure.

FIGS. 24 a, b, c, d, e are sectional views similar to FIGS. 21 and 22 but illustrating variants in which the connected conductors do not have equal circular sections.

DESCRIPTION OF CERTAIN PREFERRED EMBODIMENTS

Figure 1:
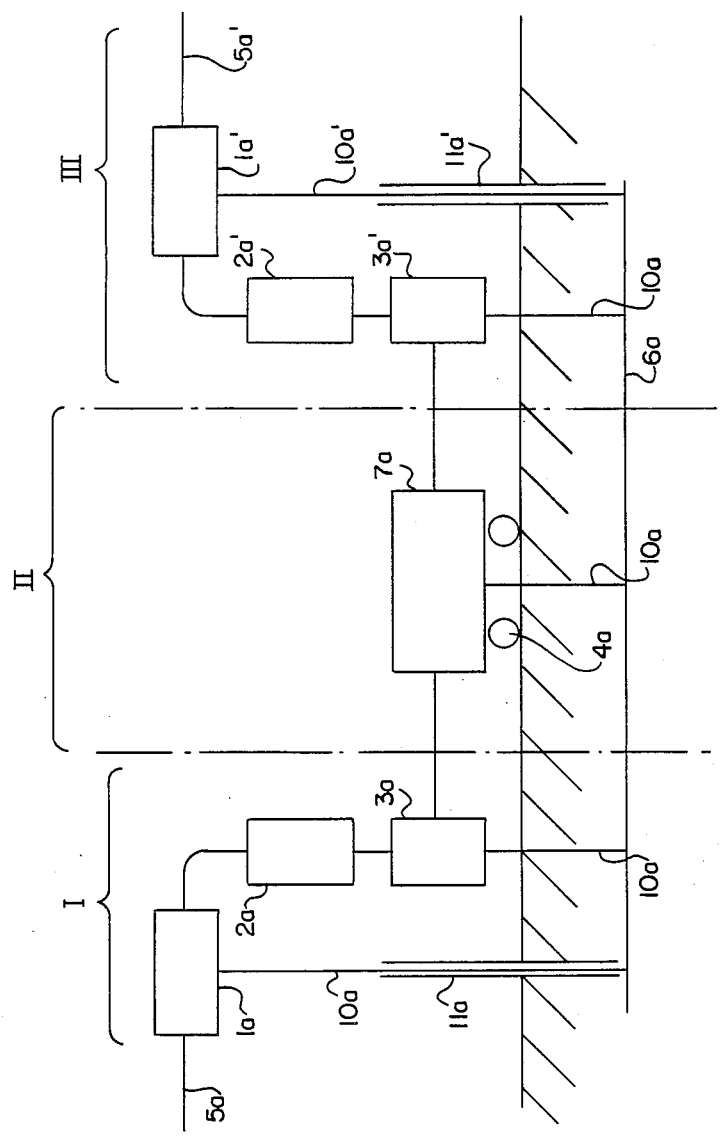
FIG. 1 is an explanatory diagram of the general layout of the invention.

In FIG. 1 an electrical installation comprising an overhead part can be divided schematically in two or three parts I, II, III, namely a part I which is the incoming part, a part II which is the installation to be protected and an eventual part III which is the outgoing overhead line. Parts I and II comprise successively an incoming line 5a, mounted in derivation on this line a grounding connection 10a through an arrester 1a which is preferably a high discharge power arrester, then as an extension of line 5a an inductance coil 2a, then again a grounding connection 10a mounted in derivation at the output of coil 2a by means of a variable resistance spark arrester 3a, then finally, supplied by line 5a, a transformer station 7a itself contained in a Faraday cage connected to the ground 6a.

Still according to the invention, the grounding connectors 10a of the spark arresters are insulated for a minimum of 1,000 V and arranged in the vicinity of the ground in an insulating sheath 11a comprising insulating fasteners (to the pole for example) with screws made of non magnetic material.

Still according to the invention the installation 7a, transformer or other, is mounted on rollers 4a made of high dielectric capacity material (composite plastic, glass or ceramic).

Part III of the installation, when it exists, comprises, still according to the invention, the same elements as those of part I These elements bear the same references, but with the addition of a prime; these are for example a second set of arresters 1a, a second inductance coil 2 a and a second variable resistance arrester 3a, and this for each of the phases.

Figure 2:
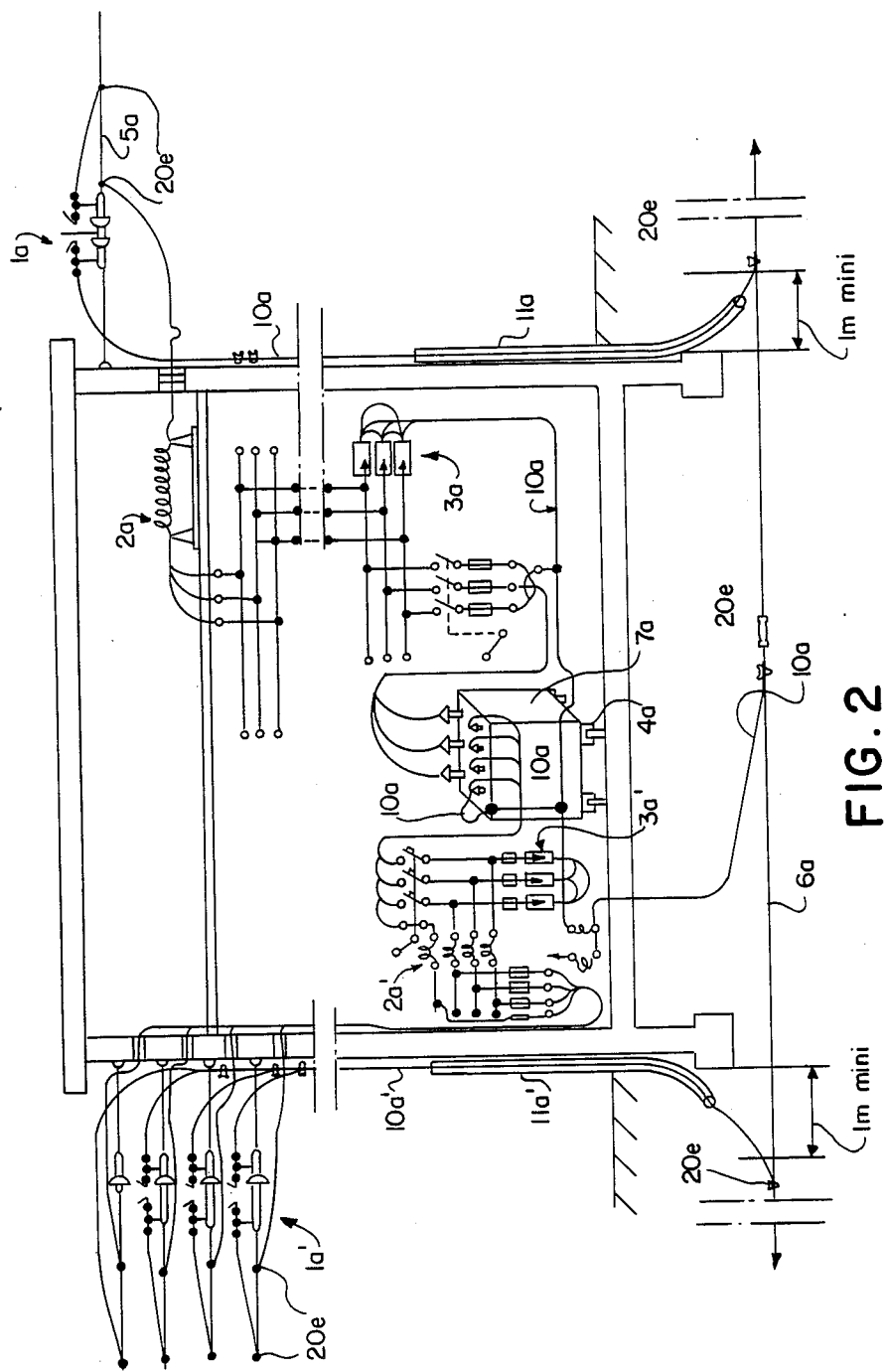
FIG. 2 is a schematic elevational view showing the application of the invention to a medium tension—low tension transformer station.
Figure 3:
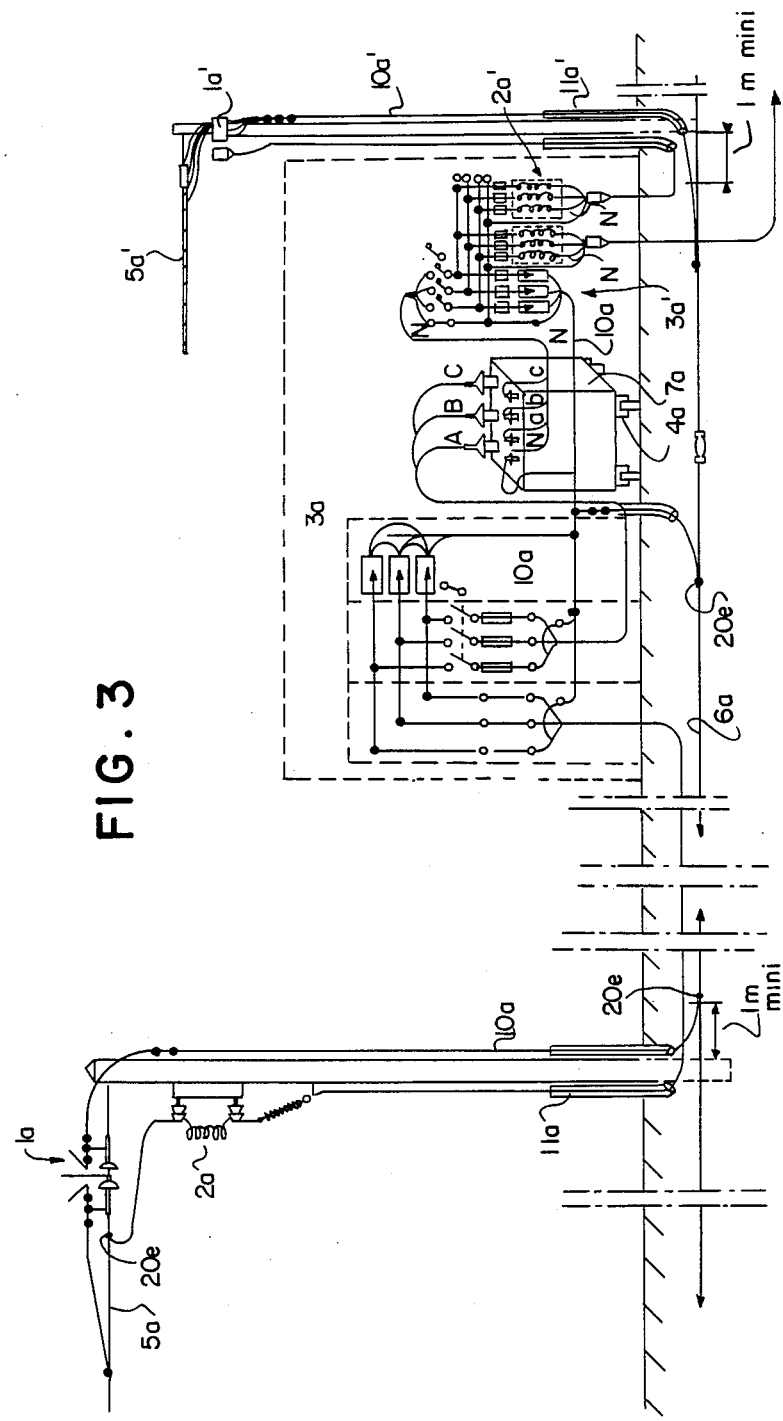
FIG. 3 is a schematic elevational view showing the application to a low tension—low tension transformer station.

In FIGS. 2 and 3 which show transformer stations, we find the characteristic elements of the invention bearing the same references as in FIG. 1; therefore they will not be described more explicitly, as the man of the art will be able to interpret these figures which, for known elements, correspond to standards in the matter.

Figure 4:
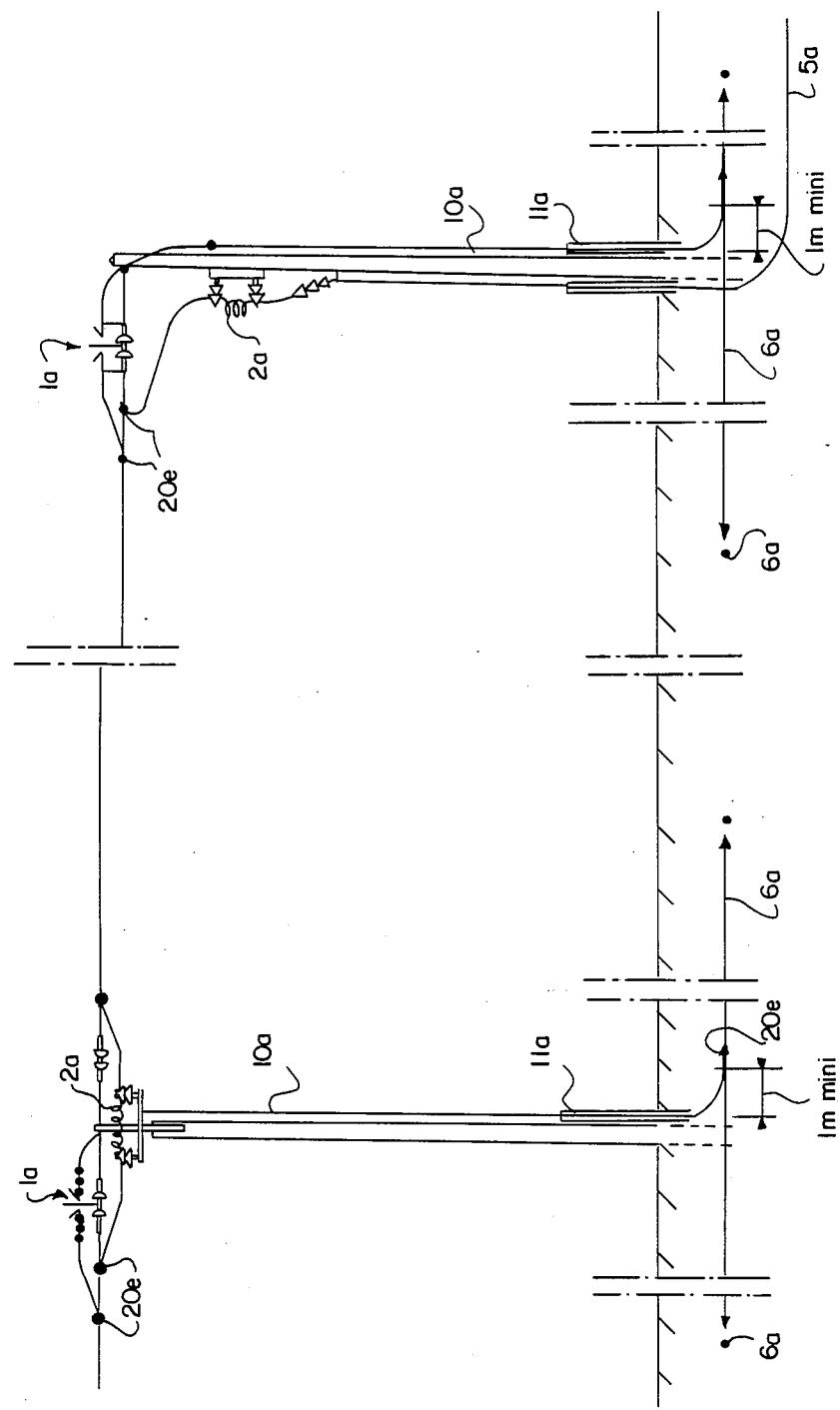
FIG. 4 is a schematic elevational view showing a variant of the previous figure in which the incoming line comprises protections in successive stages.

FIG. 4 illustrates two additional protection stages, both comprising a set of arresters 1a and a set of inductance coils 2a, it being understood that these stages are located upstream of part I.

Figures 5, 6, 7:
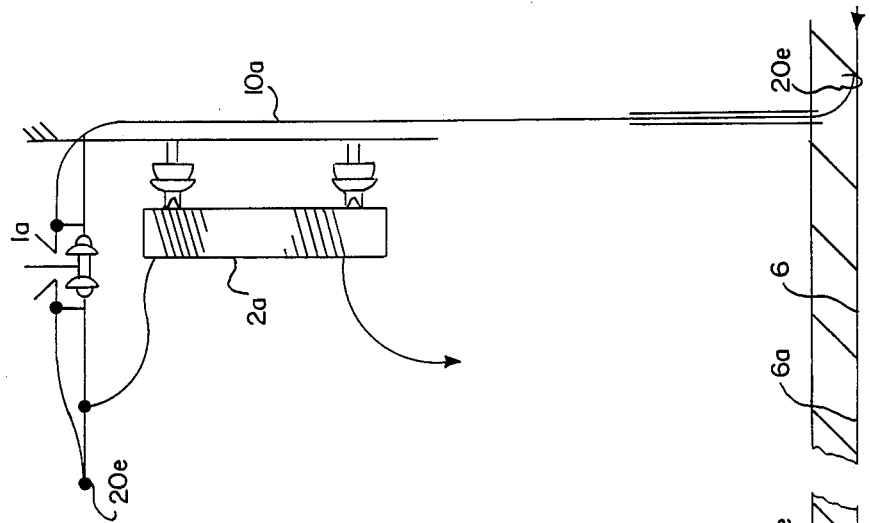
FIGS. 5 to 7 are schematic elevational views illustrating three installations implementing the arrangement of FIG. 1.

FIGS. 5, 6 and 7 illustrate three installations incorporating respectively first an arrester, a coil, a variable resistance arrester and insulating rollers for the power transformer, and secondly an arrester, a coil and a variable resistance arrester, and thirdly an arrester and a coil, these different elements being identified by the same references, respectively 1a, 2a, 3a, and 4a, which were used for them in the previous figures.

It should be noted that in all cases it is recommended to use a grounding connection 6a, a so-called equipotential universal grounding connection, of high discharge capacity.

Figure 8:
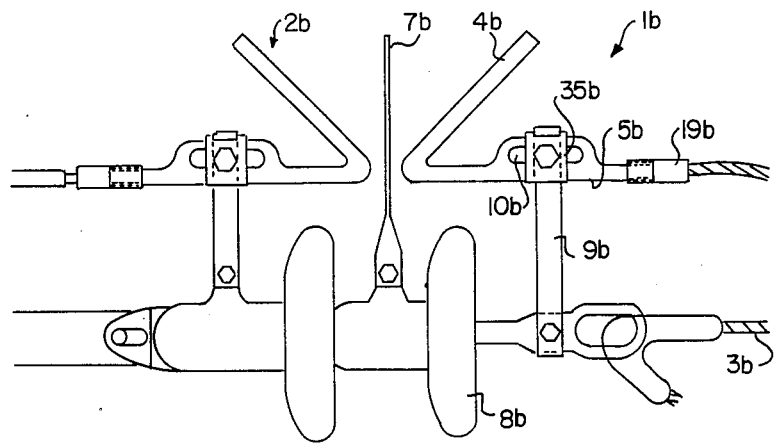
FIG. 8 is a fragmentary elevational view of a protection device with arresters according to the invention mounted in line.

In FIG. 8 a protection device includes two horns 1b and 2b, the horn 1b being connected to line 3b transporting the current to a bare conductor and the horn 2b being connected to the ground (not represented in the figure). The horn 1b is formed by an inclined branch 4b and a branch 5b; the same holds true for the other horn. The horns are at a distance such that in the event of a power surge due to lightning, an arc may form between them thus permitting the discharge of the surge to the ground through an anti-bird device 7b arranged between the horns in their plane, and supported by an insulator such as 8b. The horns are supported by a foot such as 9b, to which they are secured with screws, by means of tabs 35b folded back along the periphery of the opening 10b. The feet 9b have sections which may be square, circular, triangular, rectangular, more or less flattened; the feet, like the horns, are advantageously made of a non magnetic aluminum alloy such as duralinox, or stainless steel or other non magnetic metal, as desired.

It appears in FIG. 8 that the fastening of the horns to their foot is obtained by means of an oblong opening 10b in the horizontal branch of the horn, and this constitutes a first characteristic; according to a second characteristic, the opening is off-center with respect to the axis of the horizontal branch.

Referring to FIGS. 9A-9H, an arrester horn similar to that of FIG. 8 also comprises an oblong opening 10b offset with respect to the axis 11b of the horizontal branch 5b. This opening has been made in a flattened part 12b of the horizontal branch; this appears in the section of FIG. 9D. The section of the other parts of the branch is circular, as appears in the sections 13b and 14b of FIGS. 9C and 9E.

Figure 9:
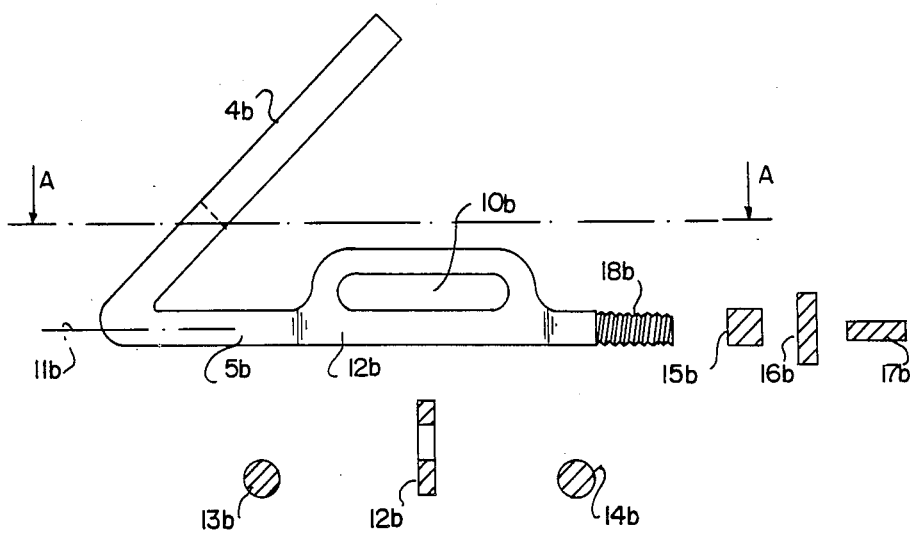
FIG. 9A is an enlarged elevational view of one of the arresters shown in FIG. 8.
FIG. 9B is a top plan view of the arrester as seen from the line A—A in FIG. 9A.
FIG. 9C, 9D and 9E are vertical sectional views respectively taken along the lines C—C, D—D, and E—E in FIG. 9B.
FIGS. 9F, 9G and 9H are vertical sectional views similar to FIG. 9E but illustrating alternative cross-sections for the arrester.
Figure 9:
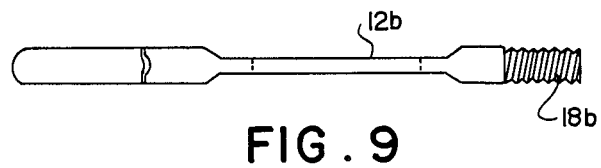

These parts 13b and 14b alternating may have square sections as illustrated by the section 15b of FIG. 9F, or rectangular, with their large dimension parallel to the plane of the horn, such as section 16b of FIG. 9G, or perpendicular to it, such as section 17b; of FIG. 9H. The same holds true for the inclined branch of the horn.

It also appears in these figures that the end of the horn opposite the inclined part includes threads 18b by which it can be screwed to a sleeve 19b (FIG. 8).

A horn according to the invention, like those of the previous figures, is advantageously made of non magnetic aluminum alloy such as duralinox, or of stainless steel or other non magnetic material, as desired. The fasteners are also made of non magnetic aluminum alloy such as duralinox, or of stainless steel or other non magnetic metal, as desired.

Figure 10:
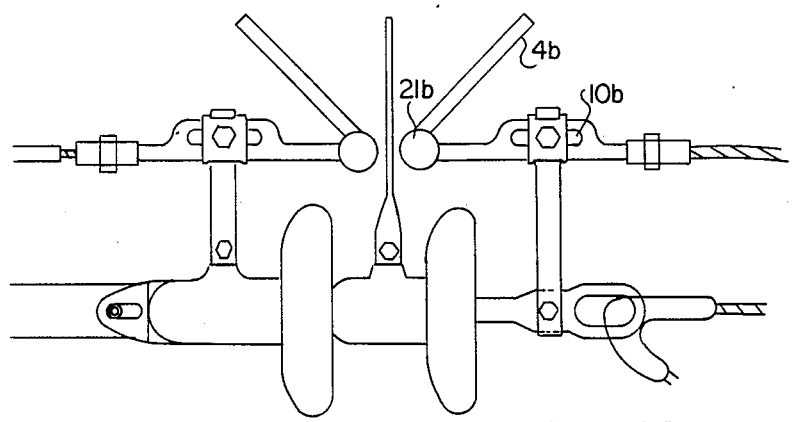
FIG. 10 is a fragmentary elevational view illustrating another embodiment of an arrester according to the invention with horns and balls.

In FIG. 10, an arrester derived from the one of the previous figures and still comprising a characteristic part with an opening 10b, differs from the others by the presence of a spherical protuberance 21b at the junction of the inclined part 4b and the horizontal part of the horns; the materials are the same as those described previously.

Figure 11:
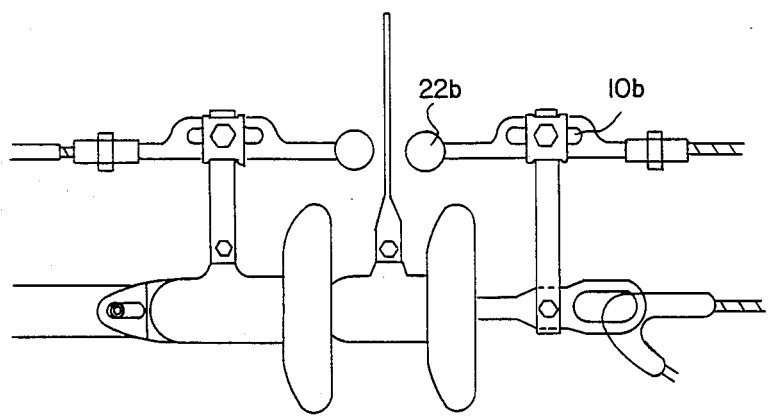
FIG. 11 is a fragmentary elevational view illustrating a further embodiment of an arrester according to the invention, with balls only.

In FIG. 11 an arrester according to the invention still comprises a characteristic part as concerns the opening 10b. The arrester is similar to the arrester of the previous figure, but differs from it by the absence of the inclined part; it retains a ball 22b.

Figure 12:
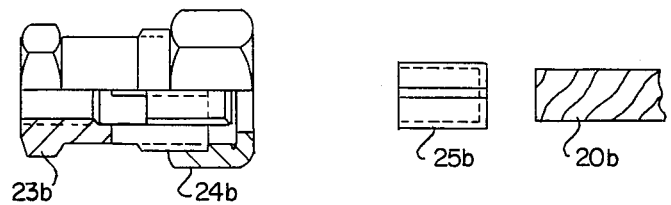
FIGS. 12 to 14 are partial sectional views illustrating various forms of a connecting accessory in accordance with the invention.
Figure 13:
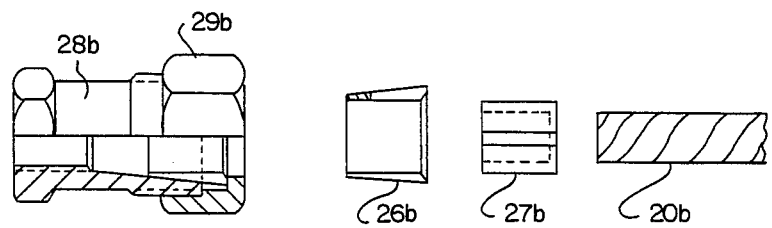
Figure 14:
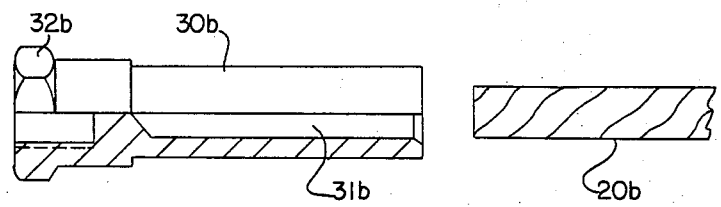

FIGS. 12 to 14 represent various forms of the sleeves 19b of FIG. 8. In FIG. 12, the sleeve is formed by a "pincer" mandrel comprising a split hollow screw 23b, a hollow screw 24b, both with conical threading, and a split bushing 25b. In FIG. 13, the connecting device includes a bronze conical bushing 26b and a bushing 27b; it also comprises a hollow screw 28b and a nut 29b having a conical recess. In FIG. 14, the connecting system includes an elongated sleeve 30b comprising a long blind boring 30b in which can be engaged and crimped the conductor 20b, and in the vicinity of its other end 32b, an interior threading. In these three versions, the parts 23b, 28b and 32b are internally threaded to the same pitch as that of the horizontal parts of the arrester. These parts 23b, 28b and 32b are also made of a non magnetic alloy of aluminum such as duralinox, stainless steel or any other non magnetic metal, as desired.

Figure 15:
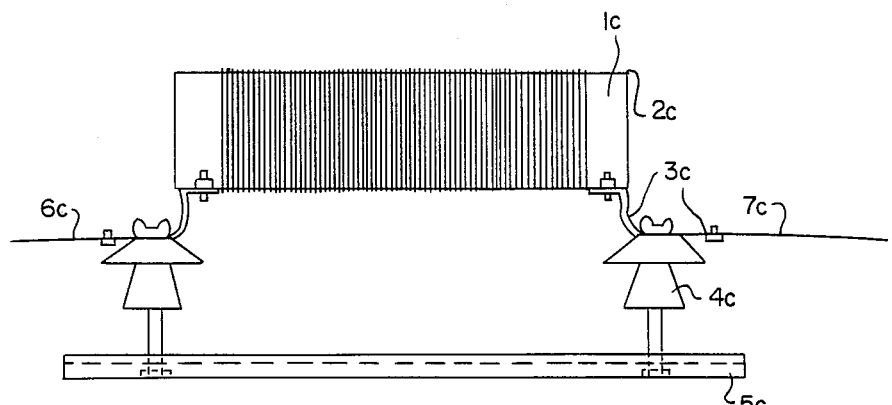
FIG. 15 is a schematic illustration of a coil according to the invention, with a single winding.

In FIG. 15, a coil according to the invention comprises a winding 1c with a single layer of winding wires insulated for a minimum of 1,000 Volts, a tube 2c, or winding sleeve, connecting elements 3c made of non magnetic metal including fasteners of like nature and, at each end of the sleeve, glass insulators 4c permanently connected at one end to the connecting elements 3c and at the other end to a U-shaped base 5c.

Figure 16:
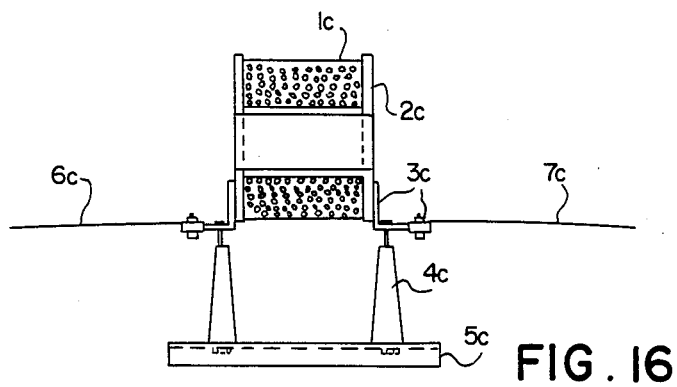
FIG. 16 similarly illustrates a coil with multiple windings.

FIG. 16 shows, with the same references, the elements similar to those of the previous figure with the difference that the sleeve 2c comprises end flanges to contain the superposed wire windings, and that the insulators are conical porcelain insulators.

In both cases the insulators are of a conventional type adapted to the design voltage of the coil. It appears clearly in the figures that the connecting elements 3c serve as electrical connection terminals for the winding with the incoming and outgoing lines, respectively 6c and 7c.

In FIG. 17, the device according to the invention comprises a pan 1d made of a non conducting non magnetic metal. The pan comprises a wall grounding terminal and a filling orifice 3d, the upper wall 4d of the pan is provided with standard porcelain terminals such as 5d for the input and 6d for the output, these terminals being of the type used for transformers. Insulation of the pan 1d with respect to the ground is provided by high insulating power rollers such as 7d; the metallic parts of these rollers are made of non magnetic metal.

In FIG. 18, the terminals of each pair, such as terminals 5d and 6d of the previous figure are connected inside the pan 1d to a winding or coil 10d, 11d or 12d. Three windings are thus arranged inside the pan and, according to this first variant, the coils are superposed in concentric layers. Each winding 10d, 11d, 12d is surrounded by a casing made of high electric coefficient material, and thus the casing 13d is superposed over the winding 10d, the casing 14d is located between the winding 10d and the winding 11d, etc. . . . The coils and their casings bathe in the transformer oil 16d constituting the highly dielectric medium.

In FIG. 19, elements similar to those of FIG. 18 are represented with the same references with the addition of a prime.

Finally, it should be noted in the two FIGS. 18 and 19 that the casing of each variant is supported in the pan by means of insulated blocks 20d or 20d.

It should be noted that in general the device according to the invention has no element made of magnetic metal and that all elements which should be made of metal are made of non magnetic metal.

In FIGS. 20a, 20b, 20c, 2d and 20e device according to the invention is composed of two shells 1e and 2e comprising an axial recess 3e of which part 4e of the wall is semi cylindrical, the contacting faces 5e comprising longitudinal reliefs (rib 6e and rib 7e) intended to fit one in the other. Each shell comprises on each of its sides three lugs such as 8e provided with an axial boring 9e for the passage of a screw 13e.

It appears in FIG. 20d in particular that the boring in the lugs of one of the shells is tapped along a portion 10e of its length while the boring of the opposite lug is tapped along its entire length. It appears in FIG. 20e that only the end part 11e of the screw 1e is threaded and that the length of this threaded part is less than the untapped part 12e of the borings in the lugs of one of the shells. This arrangement prevents separating the screws 13e of one of the shells and the screw from escaping; this is particularly useful when it is known that connection work is being carried out at a certain distance above ground.

In FIGS. 21 and 22, it appears that the cumulative depth of the recesses of the two coupled shells is slightly less than the diameter of the circular conductors 14e and 15e while the radius of the semi cylindrical parts is approximately equal to the radius of the conductors.

FIG. 21 represents an embodiment according to which one of the shells comprises two ribs while the other shell comprises two grooves. Only the shells having grooves are, for example, those in which the borings of the lugs are partially tapped.

FIG. 22 represents a embodiment in which the two shells are absolutely identical and arranged symmetrically with respect to the axis of their recesses; the advantage of this embodiment resides in the fact that the shells need not be matched before assembly.

In FIG. 23 it can be seen that the length of the connection 20e is quite substantial in comparison with the diameter of the cables 14e and 15e; it will be noted that the length of the device is never less than 130 millimeters, which appeared necessary for a safe discharge of the shock waves generated by the lightning.

Such connecting devices are advantageously utilized in the examples of electrical installations of FIGS. 2 to 7, particularly for the junction of arresters to the line and to the ground respectively, where they can be found under reference 20e.

Although the description refers to particular examples of this invention, it must be understood that its scope is not limited to these examples; indeed it extends to any installation or device entailing the general characteristics defined above.

I claim:

1. Arrangement for the protection of an installation for transformation of electric current of similar installation connected to an overhead line, characterized:

in that the electrical relation between the line and the installation comprises for each of the phases:
  at least a first set of arresters connected to the line,
  a first grounding conductor insulated for a minimum of 1,000 V for connecting the first set of arresters to ground,
  at least a first inductance coil connected to the first set of arresters and having a winding of approximately fifty loops 25 to 30 centimeters in diameter, the loops being insulated from one another to at least 1,000 V in permanent tension,
  at least one variable resistance arrester conected to the inductance coil, and
  a second grounding conductor insulated for a minimum of 1,000 V for connecting the variable resistnace arrester to ground.

2. Arrangement as in claim 1,
the grounding conductors for the arresters being insulated and located near the ground.

3. Arrangement as in claim 1, characterized:
in that, furthermore, the installation is mounted on rollers of high dielectric capacity.

4. Arrangement as in claim 1, characterized:
in that said loops of the inductance coil are wound on a tube of insulating material containing no magnetic metal part.

5. Arrangement as in claim 1, said arrangement being intended for protection against lightning, at least one of said arresters comprising a pair of metal electrodes mounted in facing relationship and in proximity to one another, one electrode in said pair being connected to the line, the other electrode in said pair being connected to the ground, each of the electrodes in said pair comprising two branches forming an acute angle between them,
  one of said branches for each electrode defining an oblong opening near the longitudinal mid-point of the one branch.

6. Arrangement as in claim 5, said oblong opening being off-center with respect to the longitudinal axis of said one branch.

7. Arrangement as in claim 1, said coil being intended for the protection of the electrical installation against lightning, said coil being of the type comprising a sleeve and a winding of electroconducting wires disposed about said sleeve
  said sleeve being made of a material having dielectric properties at least equal to those of polyethylene,
  a pair of insulators for supporting said coil made of a material such as glass or ceramic, and
  nonmagnetic metal connecting elements affixed to the sleeve and insulators.

8. Arrangement as in claim 7,
said elements connecting the sleeve to the insulators forming electrical terminals for connecting the coil to the line.

9. Arrangement as in claim 7, characterized:
  in that said insulators of said pair being identical with one another.

10. Arrangement as in claim 1, said coil being bathed in a highly dielectric medium, and a pan electrically insulated from the ground for containing the dielectric medium.

11. Arrangement as in claim 10, said medium comprising transformer oil.

12. Arrangement as in claim 10, said pan being is made of a non magnetic metal which is a good conductor.

13. Arrangement as in claim 1, which further comprises a connecting device for said line, said connecting device including a pair of shells and fastening means for securing the shells together,
  each of the shells being an elongated solid metal piece having an axial recess and longitudinal reliefs which fit into one another.

* * * * *